United States Patent
Deng et al.

(10) Patent No.: US 12,272,113 B2
(45) Date of Patent: Apr. 8, 2025

(54) SEMI-AUTOMATIC IMAGE DATA LABELING METHOD, ELECTRONIC APPARATUS, AND STORAGE MEDIUM

(71) Applicant: Wuyi University, Jiangmen (CN)

(72) Inventors: Fuqin Deng, Jiangmen (CN); Yongshen Huang, Jiangmen (CN); Jianfeng Peng, Jiangmen (CN); Hua Feng, Jiangmen (CN); Yingying Chen, Jiangmen (CN); Weike Li, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 413 days.

(21) Appl. No.: 17/772,846

(22) PCT Filed: Jul. 6, 2020

(86) PCT No.: PCT/CN2020/100348
§ 371 (c)(1),
(2) Date: Apr. 28, 2022

(87) PCT Pub. No.: WO2021/093344
PCT Pub. Date: May 20, 2021

(65) Prior Publication Data
US 2022/0375188 A1    Nov. 24, 2022

(30) Foreign Application Priority Data

Nov. 15, 2019    (CN) .......................... 201911117335.0

(51) Int. Cl.
*G06V 10/26*    (2022.01)
*G06V 10/20*    (2022.01)
(Continued)

(52) U.S. Cl.
CPC .......... *G06V 10/273* (2022.01); *G06V 10/235* (2022.01); *G06V 10/255* (2022.01); *G06V 10/764* (2022.01)

(58) Field of Classification Search
None
See application file for complete search history.

(56) References Cited

U.S. PATENT DOCUMENTS

| 9,443,316 B1* | 9/2016 | Takeda ............... G06V 30/2504 |
| 2006/0285747 A1* | 12/2006 | Blake ....................... G06T 7/162 |
| | | 382/180 |

(Continued)

FOREIGN PATENT DOCUMENTS

| CN | 102982544 A | 3/2013 |
| CN | 104574429 A | 4/2015 |

(Continued)

OTHER PUBLICATIONS

Machine translation of CN 104574429, Zheng et al., Apr. 29, 2015 (Year: 2015).*

*Primary Examiner* — Mark R Milia
(74) *Attorney, Agent, or Firm* — Vivacqua Crane, PLLC

(57) ABSTRACT

Disclosed are a semi-automatic image data labeling method, an electronic apparatus and a non-transitory computer-readable storage medium. The semi-automatic image data labeling method may include: displaying a to-be-labeled image, the to-be-labeled image comprising a selected area and an unselected area; acquiring a coordinate point of the unselected area and a first range value; executing a grabcut algorithm based on the coordinate point of the unselected area and the first range value acquired, and obtaining a binarized image divided by the grabcut algorithm; executing an edge tracking algorithm on the binarized image to acquire current edge coordinates; updating a local coordinate set based on the current edge coordinates acquired; updating the selected area of the to-be-labeled image based on the local coordinate set acquired.

6 Claims, 5 Drawing Sheets

(51) Int. Cl.
*G06V 10/22* (2022.01)
*G06V 10/764* (2022.01)

(56) References Cited

U.S. PATENT DOCUMENTS

2009/0316964 A1* 12/2009 Mahesh ................. G06T 7/215
382/128
2013/0336582 A1    12/2013 Dai
2017/0076438 A1*  3/2017 Kottenstette ........... G06V 10/82
2017/0337693 A1* 11/2017 Baruch .................... G06T 7/12

FOREIGN PATENT DOCUMENTS

| CN | 109426793 A | 3/2019 |
| CN | 110992384 A | 4/2020 |
| CN | 111028261 A | 4/2020 |

* cited by examiner

① Selected for the first time   ② Selected for the second time   ③ Selected for the third time ④ Confirm that the selection is completed   Compare with manual labeling Labeling flow of the present method GrabCut
(1) An excellent segmentation effect can be achieved by only drawing a frame outside a target to frame the target (2) Adding additional user interaction (the user designates some pixels to belong to the target) to and optimize the realized effect to get a better effect

SEMI-AUTOMATIC IMAGE DATA LABELING METHOD, ELECTRONIC APPARATUS, AND STORAGE MEDIUM

CROSS-REFERENCE TO RELATED APPLICATIONS

This application is a national stage filing under 35 U.S.C. § 371 of international application number PCT/CN2020/100348, filed on 6 Jul. 2020, which claims priority to Chinese patent application No. 2019111173350, filed on 15 Nov. 2019. The contents of these applications are incorporated herein by reference in their entirety.

TECHNICAL FIELD

The present invention relates to the technical field of computer image processing, and more particularly, to a semi-automatic image data labeling method, an electronic apparatus and a non-transitory computer-readable storage medium.

BACKGROUND

As an effective image segmentation algorithm to extract a foreground target from a complex background, a grabcut image cutting algorithm makes use of texture (color) information and boundary (contrast) information in the image, and achieves a better image segmentation effect. Inputting an image containing the target, and using the grabcut algorithm to cut the image can separate the foreground target from the background image, and output a binarized image with a white target and a black background.

An interactive method of the grabcut algorithm is realized by drawing a frame by a user. The user draws a frame to frame a foreground object and the foreground can be segmented after releasing a mouse. FIG. 5 is an effect graph of using the grabcut algorithm for image segmentation in the prior art. Generally, the grabcut algorithm may be used to segment the foreground, so as to obtain labeling data of a foreground image. However, when the grabcut algorithm is used to acquire the labeling data, only one frame may be drawn on the foreground image, which leads to a very large frame range when the grabcut algorithm is used on some foreground images with special contour shapes, thus resulting in a lot of background pixels in the frame, and decreasing the precision of the grabcut algorithm.

SUMMARY

The present invention aims at solving at least one of the technical problems in the prior art. Therefore, the present invention provides a semi-automatic image data labeling method, an electronic apparatus and a non-transitory computer-readable storage medium, which can execute a grabcut algorithm on a to-be-labeled image for multiple times to acquire an outline coordinate of a foreground image, thereby improving a labeling data precision of the image acquired.

In a first aspect, an embodiment of the present invention provides a semi-automatic image data labeling method, comprising the following steps of:
S100: displaying a to-be-labeled image, the to-be-labeled image comprising a selected area and an unselected area;
S200: acquiring a coordinate point of the unselected area and a first range value;
S300: executing a grabcut algorithm based on the coordinate point of the unselected area and the first range value acquired, and obtaining a binarized image segmented by the grabcut algorithm;
S400: executing an edge tracking algorithm on the binarized image to acquire current edge coordinates;
S500: updating a local coordinate set based on the current edge coordinates acquired;
S600: updating the selected area of the to-be-labeled image based on the local coordinate set acquired;
S700: judging whether an all-selected instruction is received; if yes, generating a whole coordinate set, and if not, returning to S200; and
S800: acquiring category information and saving the category information and the whole coordinate set as json files.

The semi-automatic image data labeling method according to the embodiment of the present invention at least has the following beneficial effects. In S200, the coordinate point of the unselected area and the first range value are acquired, a mouse is used to click on the unselected area to acquire a coordinate of the mouse as the coordinate point of the unselected area, and the coordinate point of the unselected area is used as a reference point to construct the square according to the first range value input by the user, and this square which is a frame-drawing operation in the grabcut algorithm. By selecting the coordinate point of the unselected area and the first range value for multiple times, the edge tracking algorithm may be executed after each instance of grabcut division to obtain the current edge coordinates, and the local coordinate set is updated by using the current edge coordinates. Finally, after the user confirms that the foreground area is fully selected, a key may be pressed on a keyboard to send out the all-selected instruction, then the local coordinate set in this case may be regarded as all the whole coordinate set, the user inputs the category information corresponding to the foreground image, and saves the category information and the whole coordinate set as json files for subsequent neural network training. Therefore, the semi-automatic image data labeling method provided by the embodiment can not only automatically segment by the grabcut algorithm, but also accept manual real-time intervention, thereby improving the precision of image data labeling.

In a specific embodiment of the present invention, the first range value is used for constructing a square, and acquiring the first range value comprises the following steps of:
S210: judging whether the selected area is vacant; if yes, executing S300, and if not, executing S220; and
S220: judging whether a range of the square constructed by the first range value contains a coordinate in the local coordinate set, and if yes, executing S300.

In a specific embodiment of the present invention, the updating the selected area of the to-be-labeled image based on the local coordinate set acquired comprises:
highlighting or shadowing an area enclosed by coordinates in the local coordinate set.

In a specific embodiment of the present invention, the updating the local coordinate set based on the current edge coordinates acquired comprises the following steps of:
S510: judging whether the selected area is vacant; if yes, adding the current edge coordinates into the local coordinate set, and if not, executing S520; and
S520: deleting a coordinate in the current edge coordinates that is duplicated with a coordinate in the local coordinate set and then adding the remaining coordinates to the local coordinate set.

In a specific embodiment of the present invention, the generating the whole coordinate set comprises the following steps of:

S710: S710: establishing a set A', adding any coordinate point $p_0$, in the local coordinate set to the set A', establishing other coordinate points except $p_0$, in the local coordinate set as a set $A_2$, and setting a first labeled coordinate point p as $p_0$;

S720: judging whether a number of elements in the set $A_2$ is zero; if not, executing S720a, and if yes, executing S720b;

S720a: calculating distances d between all coordinate points in the set $A_2$ and the first labeled coordinate point p, setting the first labeled coordinate point p as a coordinate point corresponding to the minimum distance d in the set $A_2$, adding the coordinate point corresponding to the minimum distance d in the set $A_2$ into the set A' and deleting the coordinate point from the set $A_2$, and returning to S720;

S720b: sorting the coordinate points according to an order in which the coordinate points are added to the set A';

S730: establishing the whole coordinate set, adding $p_0$ into the whole coordinate set and deleting $p_0$ from the set A', and setting a second labeled coordinate point p' as $p_0$;

S740: judging whether a number of elements in the set A' is 1; if not, executing S740a, and if yes, executing S740b;

S740a: judging whether the second labeled coordinate point p' is collinear with the two coordinate points ranked in the first two places in the set A'; if yes, executing S740a1, and if not, executing S740a2;

S740a1: deleting the coordinate point in the first place in the set A' from the set A', and returning to S740;

S740a2: setting the second labeled coordinate point p' as the coordinate point ranked in the first place in the set A', adding the coordinate point ranked in the first place in the set A' to the whole coordinate set and deleting the coordinate point from the set A', and returning to S740; and S740b: adding the coordinate points in the set A' to the whole coordinate set and outputting the whole coordinate set.

In a second aspect, an embodiment of the present invention provides an electronic apparatus, comprising: a memory, a processor and a computer program stored on the memory and operatable on the processor, wherein the processor, when executing the program, implements the semi-automatic image data labeling method according to any one of the first aspect above.

The electronic apparatus according to the embodiment of the present invention has all the beneficial effects of the first aspect of the present invention because the electronic apparatus executes the semi-automatic image data labeling method according to any one of the first aspect above.

In a third aspect, an embodiment of the present invention provides a non-transitory computer-readable storage medium storing a computer-executable instruction, wherein the computer-executable instruction is used for executing the semi-automatic image data labeling method according to any one of the first aspect above.

The non-transitory computer-readable storage medium according to the embodiment of the present invention has all the beneficial effects of the first aspect of the present invention because the non-transitory computer-readable storage medium executes the semi-automatic image data labeling method according to any one of the first aspect above.

Part of the additional aspects and advantages of the present invention will be given in part in the following description, and will become apparent in part from the following description, or will be learned through the practice of the present invention.

BRIEF DESCRIPTION OF DRAWINGS

The above and/or additional aspects and advantages of the present invention will be more apparent from the following description of the embodiments in conjunction with the accompanying drawings, in which.

Figure 1:
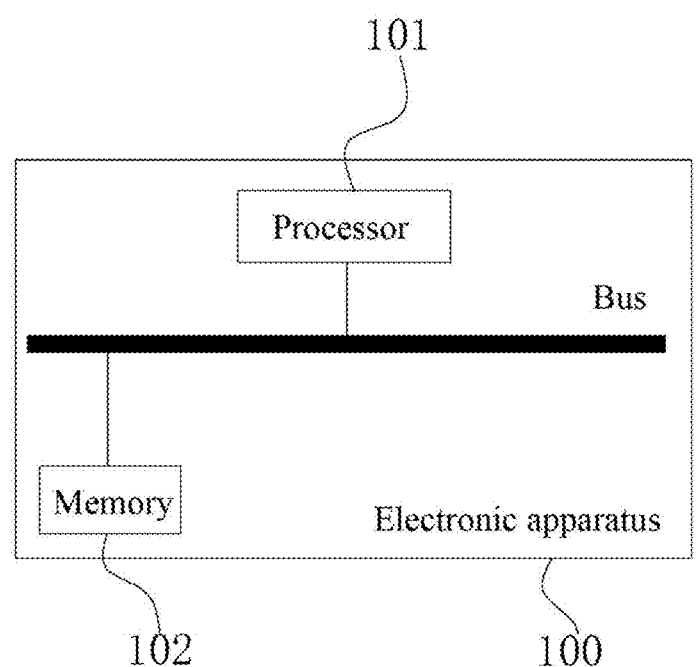
FIG. 1 is a schematic structural diagram of an electronic apparatus provided by a first embodiment of the present invention.

REFERENCE NUMERALS 100 refers to electronic apparatus, 101 refers to processor, and 102 refers to memory.

DETAILED DESCRIPTION

The embodiments of the present invention will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the present invention, but should not be construed as limiting the present invention.

In the description of the present invention, it shall be understood that the orientation or position relation related to the orientation description, such as the orientation or position relation indicated by the upper, lower, front, rear, left, right, etc., is based on the orientation or position relation shown in the drawings, which is only used for convenience of description of the present invention and simplification of description instead of indicating or implying that the indicated device or element must have a specific orientation, and be constructed and operated in a specific orientation, and thus shall not be understood as a limitation to the present invention.

In the description of the present invention, the meaning of several refers to be one or more, and the meaning of multiple refers to be more than two. The meanings of greater than, less than, more than, etc., are understood as not including this number, while the meanings of above, below, within, etc., are understood as including this number. If there is a description to the first and second, it is only for the purpose of distinguishing technical features, and shall not be understood as indicating or implying relative importance, implicitly indicating the number of the indicated technical features or implicitly indicating the order of the indicated technical features.

In the description of the present invention, unless otherwise explicitly defined, words such as setting, installing and connecting should be understood in a broad sense, and those skilled in the art can reasonably determine the specific meanings of the above words in the present invention, in combination with the specific contents of the technical solutions.

With the continuous breakthrough of computer technologies, artificial intelligence has become the theme of this era, and deep learning has become a huge breakthrough technology in recent years. However, the training of image segmentation networks based on deep learning needs a lot of image labeling data, such as intelligent garbage sorting system, which needs image labeling data to learn to identify garbage and garbage types. If this system is expected to identify waste paper, it is necessary to cut a large number of images containing waste paper (such as waste paper on the ground) to get waste paper images and background images, then label the waste paper images with data, and then submit the image labeling data to the system for learning.

Thus it can be seen that many systems that need intelligent identification, such as the intelligent garbage sorting system mentioned above, a surface defect detection system and automatic driving, all need a lot of image labeling data, which have to be segmented from images. There is an increasing demand for the image labeling data. To acquire the image labeling data, firstly, it is necessary to divide images containing targets into two parts comprising a target image and a background image, and then label the target image.

In order to meet the training requirements of the image segmentation networks based on deep learning for the image labeling data, a technology crowdsourcing platform emerges at the right moment. Some companies recruit tens of thousands of data labelers. However, due to some shortcomings of the existing data labeling methods, acquiring a large amount of image labeling data also needs to consume a lot of manpower, material resources and financial resources.

The existing data labeling method is to use open-source image segmentation data labeling tools (such as Labelme, Labelimg, or the like) to dot-plot edges of the target image (drawing the edges of the target object in the image by clicking the mouse, which may be clicked for hundreds of times in case of wanting to dot-plot the target objects with complex shapes, you may need to click the mouse hundreds of times), then separate the target image from the background, that is, segment the image to get the target image, and then label the target image acquired.

The present invention relates to an image segmentation technology with a traditional image segmentation algorithm grabcut as the main algorithm, and provides a pioneering semi-automatic data labeling method, which greatly reduces the times of dot-plotting or mouse clicking. Meanwhile, due to some chromatic aberration analysis mechanisms of the grabcut algorithm, the efficiency and precision of data labeling can be improved, and the training requirements of image segmentation networks based on deep learning for image data can be met.

Based on this, the present invention provides a semi-automatic image data labeling method, an electronic apparatus and a non-transitory computer-readable storage medium. By displaying a to-be-labeled image on an electronic screen, current edge coordinates of outlines can be obtained by stages and areas for images with complex outline shapes of foreground images according to a coordinate point of an unselected area generated by a user clicking on the to-be-labeled image for many times and the first range value input by the user after generating the coordinate point of the unselected area in each time. Finally, the current edge coordinates acquired by stages and areas are merged into a local coordinate set, and after the user confirms that the foreground image is completely selected, the user sends an all-selected instruction. After receiving the all-selected instruction, a computer takes the current local coordinate set as a whole coordinate set, and receives classification information input by the user through the keyboard, such as football, and the like. Finally, the classification information and the whole coordinate set are saved as json files, which are convenient for future neural network training.

Many different embodiments or examples are provided below to realize different schemes of the present invention. It should be understood that the following description is only an exemplary description, not a specific limitation of the present invention.

Figure 4:
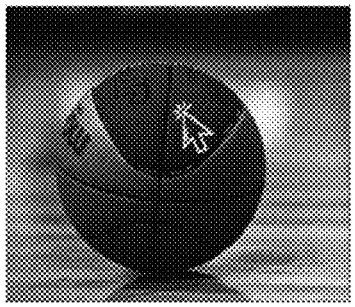
FIG. 4 is an effect graph of a semi-automatic image data labeling method provided by a fourth embodiment of the present invention.
Figure 4:
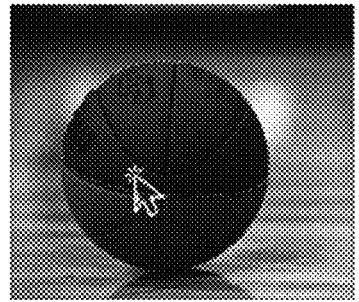
Figure 4:
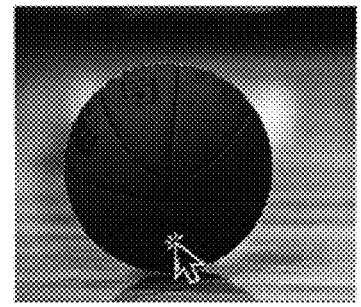
Figure 4:
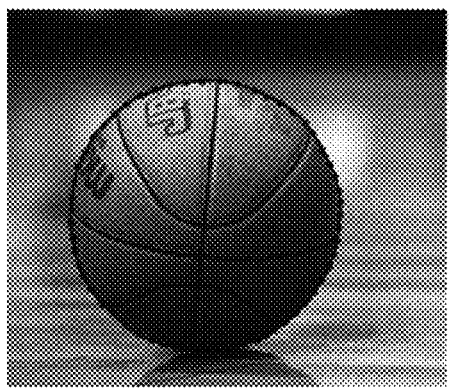
Figure 4:
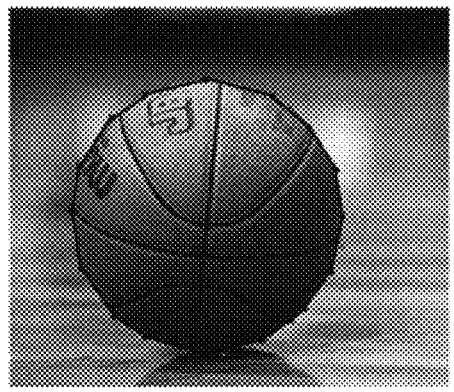
Figure 5:
FIG. 5 is an effect graph of using a grabcut algorithm for image segmentation in the prior art.
Figure 5:
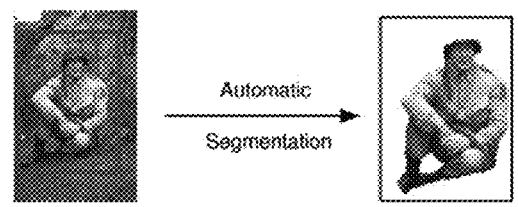

Referring to FIG. 1, which shows an electronic apparatus 100 provided by a first embodiment of the present invention, comprising a memory 102 and a processor 101. In FIG. 4, one processor 101 and one memory 102 are taken as examples.

The processor and the memory may be connected by a bus or other ways, and connecting by bus is taken as an example in FIG. 1.

As a non-transient computer-readable storage medium, the memory 102 may be used to store non-transient software programs and non-transient computer-executable programs. In addition, the memory 102 may comprise a high-speed random access memory, and may also comprise a non-transitory memory, such as at least one disk memory device, a flash memory device, or other non-transitory solid storage devices. In some embodiments, the memory 102 optionally comprises a memory 102 remotely disposed with respect to the processor, which may be connected to the electronic apparatus 100 through a network. Examples of the networks above comprise, but are not limited to, the Internet, intranet, local area networks, mobile communication networks, and combinations thereof.

Figure 2:
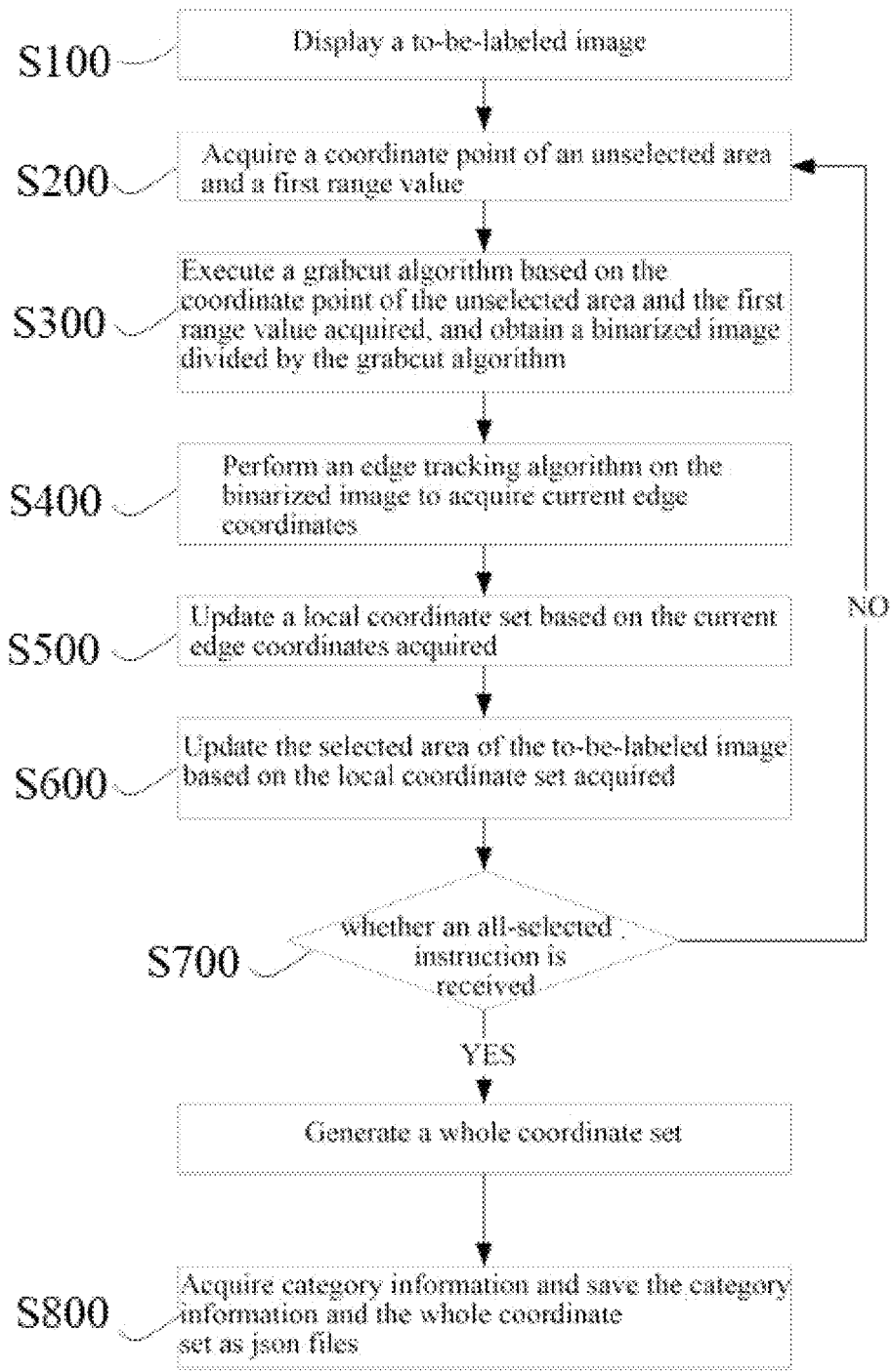
FIG. 2 is a flow chart of a semi-automatic image data labeling method provided by a second embodiment of the present invention.

FIG. 2 shows the electronic apparatus according to the first embodiment of the present invention. In this embodiment, the processor 101 in the electronic device 100 may be used to call a semi-automatic image data labeling method stored in the memory 102, and perform the following steps of:

S100: displaying a to-be-labeled image, the to-be-labeled image comprising a selected area and an unselected area;

S200: acquiring a coordinate point of the unselected area and a first range value;

S300: executing a grabcut algorithm based on the coordinate point of the unselected area and the first range value acquired, and obtaining a binarized image divided by the grabcut algorithm;

S400: executing an edge tracking algorithm on the binarized image to acquire current edge coordinates;

S500: updating a local coordinate set based on the current edge coordinates acquired;

S600: updating the selected area of the to-be-labeled image based on the local coordinate set acquired;

S700: judging whether an all-selected instruction is received; if yes, generating a whole coordinate set, and if not, returning to S200; and S800: acquiring category information and saving the category information and the whole coordinate set as json files.

Based on the hardware structure of the above electronic apparatus, various embodiments of the semi-automatic image data labeling method of the present invention are proposed.

FIG. 2 shows a semi-automatic image data labeling method according to a second embodiment of the present invention, comprising the following steps of:

S100: displaying a to-be-labeled image, the to-be-labeled image comprising a selected area and an unselected area;

S200: acquiring a coordinate point of the unselected area and a first range value;

S300: executing a grabcut algorithm based on the coordinate point of the unselected area and the first range value acquired, and obtaining a binarized image divided by the grabcut algorithm;

S400: executing an edge tracking algorithm on the binarized image to acquire current edge coordinates;

S500: updating a local coordinate set based on the current edge coordinates acquired;

S600: updating the selected area of the to-be-labeled image based on the local coordinate set acquired;

S700: judging whether an all-selected instruction is received; if yes, generating a whole coordinate set, and if not, returning to S200; and S800: acquiring category information and saving the category information and the whole coordinate set as json files.

In this embodiment, the to-be-labeled image may be displayed to a labeler through a PC screen or a tablet screen, and the labeled image comprises a foreground area and a background area. The labeler clicks on the foreground area with a mouse to generate a mouse event, so as to obtain the coordinate clicked by the mouse on the to-be-labeled image as the coordinate point of the unselected area. Then, the labeler inputs a numerical value from a keyboard as the first range value. The first range value comprises a distance value and an angle value input by the labeler from the keyboard. The distance value represents pixel points on the to-be-labeled image that meet the distance value with the coordinate point of the unselected area. Then, the angle value is rotated around the coordinate point of the unselected area to select a pixel point that meets the distance value as a diagonal point of the square, thus determining a square, and forming this square equivalent to a frame-drawing interaction mode in the grabcut algorithm.

After acquiring the coordinate point of the unselected area and the first range value to generate the square, the grabcut algorithm is executed to obtain the binarized image after division. After the image segmentation, the image may be divided into two parts comprising a target object (i.e., foreground) and a background. Then all the pixels of the target object are set to black and all the pixels of the background are set to white in a system, so all the pixels of the image are divided into two numerical values, black and white. This is the binarized image. These data are stored in the system, and then the edge tracking algorithm is applied to the binarized image to obtain the current edge coordinates, which are outline pixel coordinates of the current binarized image.

The current edge coordinates are saved as the local coordinate set, and an area enclosed by the coordinates in the local coordinate set are highlighted or shadowed. This part of area that is highlighted or shadowed is the selected area.

In the case that the foreground image is complex, the selected area may only be a part of the foreground when the grabcut algorithm is executed for the first time. Therefore, if the labeler does not send an all-selected instruction, the position of the mouse may be re-captured to form a new coordinate point of the unselected area and wait for the user to input a new first range value, and then execute the grabcut algorithm on the unselected area to obtain new current edge coordinates. After acquiring the new current edge coordinates, the new edge coordinates are compared with the coordinates in the local coordinate set obtained in the previous round, delete the same current edge coordinates, add the remaining current edge coordinates into the local coordinate set, and then highlight or shadow the area enclosed by the coordinates in the local coordinate set of this round. The selected area in this round may increase. According to the judgment of the labeler, if it is considered that the current selected area has not met the precision requirement, S200 may continue to be repeated, until the labeler thinks that the coincidence degree between the selected area and the foreground meets the requirements, and the all-selected instruction may be sent to complete the labeling of one to-be-labeled image. With the method of this embodiment, multiple small-scale image segmentation algorithms can be realized, which can improve the precision of the semi-automatic labeling for images with complex outline shapes.

Figure 3:
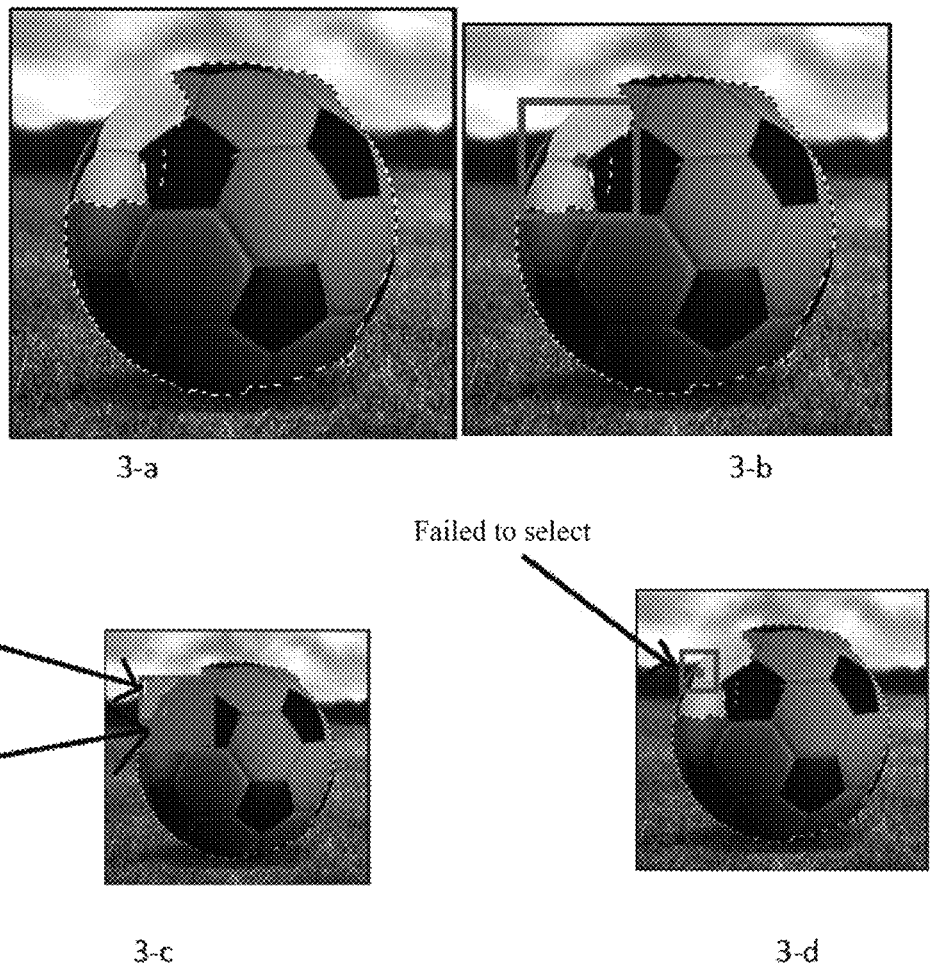
FIG. 3 is an effect graph of constructing a square according to a third embodiment of the present invention.

FIG. 3 is an effect graph of constructing a square according to a third embodiment of the present invention. The third embodiment of the present invention provides a semi-automatic image data labeling method, wherein the first range value is used for constructing the square, and acquiring the first range value comprises the following steps of:

S210: judging whether the selected area is vacant; if yes, executing S300, and if not, executing S220; and S220: judging whether a range of the square constructed by the first range value contains a coordinate in the local coordinate set, and if yes, executing S300.

In this embodiment, when the coordinate point of the unselected area is acquired for the first time, the selected area is vacant, and the judgment is based on whether the local coordinate set is vacant. If a coordinate exists in the local coordinate set, it is judged that the selected area is not vacant.

When the coordinate point of the unselected area is obtained for the second time, the selected area is not vacant. As shown in FIG. 3-*a*, FIG. 3-*b* and FIG. 3-*c*, after clicking the unselected area with the mouse for the second time and acquiring the first range value, THE grabcut algorithm may be executed to acquire the binarized image of the range of the square, then the current edge coordinates are acquired, and then the current edge coordinates are merged with the local coordinate set in the first time. This process is called updating the local coordinate set.

As shown in FIG. 3-*d*, in this embodiment, it is stipulated that if the range of the square formed by the coordinate point of the unselected area and the first range value for the second time does not comprise any coordinates in the local coordinate set for the first time, the square cannot be selected, and the labeler needs to re-enter the first range value.

A fourth embodiment of the present invention provides a semi-automatic image data labeling method, wherein the updating the selected area of the to-be-labeled image based on the local coordinate set acquired comprises:

highlighting or shadowing an area enclosed by coordinates in the local coordinate set.

In this embodiment, the area enclosed by the coordinates in the local coordinate set is highlighted or shadowed to facilitate the labeler to confirm the selected area and the unselected area. It is convenient for the user to identify the currently selected area by increasing the brightness and adjusting colors of the pixels in the area enclosed by the coordinates in the local coordinate set.

FIG. 4 is an effect graph of a semi-automatic image data labeling method provided by a fourth embodiment of the present invention. A shadow algorithm is used for all the pixels in the area enclosed by the coordinates in the local coordinate set, so that the area is shadowed to output an image with a darkened local area, which is convenient for the user to identify a selected local area in the target object.

A fifth embodiment of the present invention provides a semi-automatic image data labeling method, wherein the updating the local coordinate set based on the current edge coordinates acquired comprises the following steps of:

S510: judging whether the selected area is vacant; if yes, adding the current edge coordinates into the local coordinate set, and if not, executing S520; and S520: deleting a coordinate in the current edge coordinates that is duplicated with a coordinate in the local coordinate set and then adding the remaining coordinates to the local coordinate set.

In this embodiment, the local coordinate set is updated for once in each round, and the area enclosed by the coordinates in the local coordinate set is highlighted or shadowed, and fed back to the labeler in real time to facilitate the operation of the labeler.

A sixth embodiment of the present invention provides a semi-automatic image data labeling method, wherein the generating the whole coordinate set comprises the following steps of:

S710: S710: establishing a set A', adding any coordinate point $p_0$ in the local coordinate set to the set A', establishing other coordinate points except $p_0$ in the local coordinate set as a set $A_2$, and setting a first labeled coordinate point p as $p_0$;

S720: judging whether a number of elements in the set $A_2$ is zero; if not, executing S720a, and if yes, executing S720b;

S720a: calculating distances d between all coordinate points in the set $A_2$ and the first labeled coordinate point p, setting the first labeled coordinate point p as a coordinate point corresponding to the minimum distance d in the set $A_2$, adding the coordinate point corresponding to the minimum distance d in the set $A_2$ into the set A' and deleting the coordinate point from the set $A_2$ and returning to S720;

S720b: sorting the coordinate points according to an order in which the coordinate points are added to the set A';

S730: establishing the whole coordinate set, adding $p_0$ into the whole coordinate set and deleting $p_0$ from the set A', and setting a second labeled coordinate point p' as $p_0$;

S740: judging whether a number of elements in the set A' is 1; if not, executing S740a, and if yes, executing S740b;

S740a: judging whether the second labeled coordinate point p' is collinear with the two coordinate points ranked in the first two places in the set A'; if yes, executing S740a1, and if not, executing S740a2;

S740a1: deleting the coordinate point in the first place in the set A' from the set A', and returning to S740;

S740a2: setting the second labeled coordinate point p' as the coordinate point ranked in the first place in the set A', adding the coordinate point ranked in the first place in the set A' to the whole coordinate set and deleting the coordinate point from the set A', and returning to S740; and S740b: adding the coordinate points in the set A' to the whole coordinate set and outputting the whole coordinate set.

In manual labeling, for the case where part of the outline of the foreground area is straight, for example, for the case where the real target area is a square, the labeler usually only clicks four vertices of the square with the mouse and pulls a straight line between two adjacent vertices. Therefore, only four pixel points are needed to represent coordinates of the square, which greatly reduces the data volume. However, when using a semi-automatic labeling method, because the grabcut algorithm is used to realize automatic segmentation, and edge tracking algorithm is executed to acquire edge pixel coordinates of the binarized image as the current edge coordinates, the current edge coordinates are composed of a series of neighboring pixel points, while the whole coordinate set is composed of the current edge coordinates obtained by many times, resulting in a large data volume of the whole coordinate set.

This embodiment provides an algorithm to simplify the coordinates in the whole coordinate set obtained. The algorithm comprises two parts. The first part is from S710 to S720. These steps sort the coordinate points in the whole coordinate set according to an order in which the coordinate points are added to the set A'. If the coordinate points in the whole coordinate set are passed through in turn according to the order in which the coordinate points are added to the set A', these coordinate points just enclose the outline of the selected area. Therefore, the second part of S730 to S740 is to sequentially check whether the three adjacent points on the outline of the selected area are collinear according to the order of adding these point to the set A', and if the three adjacent points are collinear, the middle point is removed, and only the first and third points are reserved, thus achieving the effect of manual labeling and reducing the data volume generated by semi-automatic labeling.

A seventh embodiment of the present invention provides a non-transitory computer-readable storage medium storing a computer-executable instruction, wherein the computer-executable instruction is used for executing the semi-automatic image data labeling method according to any one of the second to sixth embodiments above.

The embodiments of the present invention are described in detail with reference to the drawings above, but the present invention is not limited to the above embodiments, and various changes may also be made within the knowledge scope of those of ordinary skills in the art without departing from the purpose of the present invention.

What is claimed is:

1. A semi-automatic image data labeling method, comprising:

S100: displaying a to-be-labeled image, the to-be-labeled image comprising a selected area and an unselected area;

S200: acquiring a coordinate point of the unselected area and a first range value;

S300: executing a grabcut algorithm based on the coordinate point of the unselected area and the first range value acquired, and obtaining a binarized image divided by the grabcut algorithm;

S400: executing an edge tracking algorithm on the binarized image to acquire current edge coordinates;

S500: updating a local coordinate set based on the current edge coordinates acquired;

S600: updating the selected area of the to-be-labeled image based on the local coordinate set acquired;

S700: judging whether an all-selected instruction is received; if yes, generating a whole coordinate set, and if not, returning to S200; and S800: acquiring category information and saving the category information and the whole coordinate set as json files; and wherein the generating the whole coordinate set comprises the following steps of:

S710: establishing a set A', adding any coordinate point $p_0$ in the local coordinate set to the set A', establishing other coordinate points except $p_0$ in the local coordinate set as a set $A_2$, and setting a first labeled coordinate point p as $p_0$;

S720: judging whether a number of elements in the set $A_2$ is zero; if not, executing S720a, and if yes, executing S720b;

S720a: calculating distances d between all coordinate points in the set $A_2$ and the first labeled coordinate point p, setting the first labeled coordinate point p as a coordinate point corresponding to the minimum distance d in the set $A_2$, adding the coordinate point corresponding to the minimum distance d in the set $A_2$ into the set A' and deleting the coordinate point from the set $A_2$, and returning to S720;

S720b: sorting the coordinate points according to an order in which the coordinate points are added to the set A';

S730: establishing the whole coordinate set, adding $p_0$ into the whole coordinate set and deleting $p_0$ from the set A', and setting a second labeled coordinate point p' as $p_0$;

S740: judging whether a number of elements in the set A' is 1; if not, executing S740a, and if yes, executing S740b;

S740a: judging whether the second labeled coordinate point p' is collinear with the two coordinate points ranked in the first two places in the set A'; if yes, executing S740a1, and if not, executing S740a2;

S740a1: deleting the coordinate point in the first place in the set A' from the set A', and returning to S740;

S740a2: setting the second labeled coordinate point p' as the coordinate point ranked in the first place in the set A', adding the coordinate point ranked in the first place in the set A' to the whole coordinate set and deleting the coordinate point from the set A', and returning to S740; and S740b: adding the coordinate points in the set A' to the whole coordinate set and outputting the whole coordinate set.

2. The semi-automatic image data labeling method of claim 1, wherein the first range value is used for constructing a square, and acquiring the first range value comprises the following steps of:

S210: judging whether the selected area is vacant; if yes, executing S300, and if not, executing S220; and S220: judging whether a range of the square constructed by the first range value contains a coordinate in the local coordinate set, and if yes, executing S300.

3. The semi-automatic image data labeling method of claim 1, wherein the updating the selected area of the to-be-labeled image based on the local coordinate set acquired comprises:

highlighting or shadowing an area enclosed by coordinates in the local coordinate set.

4. The semi-automatic image data labeling method of claim 1, wherein the updating the local coordinate set based on the current edge coordinates acquired comprises the following steps of:

S510: judging whether the selected area is vacant; if yes, adding the current edge coordinates into the local coordinate set, and if not, executing S520; and S520: deleting a coordinate in the current edge coordinates that is duplicated with a coordinate in the local coordinate set and then adding the remaining coordinates to the local coordinate set.

5. An electronic apparatus, comprising a memory, a processor and a computer program stored in the memory, wherein the computer program, when executed by the processor, causes the processor to perform the steps of a semi-automatic image data labeling method, comprising:

S100: displaying a to-be-labeled image, the to-be-labeled image comprising a selected area and an unselected area;

S200: acquiring a coordinate point of the unselected area and a first range value;

S300: executing a grabcut algorithm based on the coordinate point of the unselected area and the first range value acquired, and obtaining a binarized image divided by the grabcut algorithm;

S400: executing an edge tracking algorithm on the binarized image to acquire current edge coordinates;

S500: updating a local coordinate set based on the current edge coordinates acquired;

S600: updating the selected area of the to-be-labeled image based on the local coordinate set acquired;

S700: judging whether an all-selected instruction is received; if yes, generating a whole coordinate set, and if not, returning to S200; and S800: acquiring category information and saving the category information and the whole coordinate set as json files; and wherein the generating the whole coordinate set comprises the following steps of:

S710: establishing a set A', adding any coordinate point $p_0$ in the local coordinate set to the set A', establishing other coordinate points except $p_0$ in the local coordinate set as a set $A_2$, and setting a first labeled coordinate point p as $p_0$;

S720: judging whether a number of elements in the set $A_2$ is zero; if not, executing S720a, and if yes, executing S720b;

S720a: calculating distances d between all coordinate points in the set $A_2$ and the first labeled coordinate poont p, setting the first labeled coordinate point p as a coordinate point corresponding to the minimum distance d in the set $A_2$, adding the coordinate point corresponding to the minimum distance d in the set $A_2$ into the set A' and deleting the coordinate point from the set $A_2$, and returning to S720;

S720b: sorting the coordinate points according to an order in which the coordinate points are added to the set A';

S730: establishing the whole coordinate set, adding $p_0$ into the whole coordinate set and deleting $p_0$ from the set A', and setting a second labeled coordinate point p'as $p_0$;

S740: judging whether a number of elements in the set A' is 1; if not, executing S740a, and if yes, executing S740b;

S740a: judging whether the second labeled coordinate point p' is collinear with the two coordinate points ranked in the first two places in the set A'; if yes, executing S740a1, and if not, executing S740a2;

S740a1: deleting the coordinate point in the first place in the set A' from the set A', and returning to S740;

S740a2: setting the second labeled coordinate point p' as the coordinate point ranked in the first place in the set A', adding the coordinate point ranked in the first place in the set A' to the whole coordinate set and deleting the coordinate point from the set A', and returning to S740; and S740b: adding the coordinate points in the set A' to the whole coordinate set and outputting the whole coordinate set.

6. A non-transitory computer-readable storage medium, storing computer-executable instructions which, when executed by a processor, causes the processor to perform the steps of a semi-automatic image data labeling method, comprising:

S100: displaying a to-be-labeled image, the to-be-labeled image comprising a selected area and an unselected area;

S200: acquiring a coordinate point of the unselected area and a first range value;

S300: executing a grabcut algorithm based on the coordinate point of the unselected area and the first range value acquired, and obtaining a binarized image divided by the grabcut algorithm;

S400: executing an edge tracking algorithm on the binarized image to acquire current edge coordinates;

S500: updating a local coordinate set based on the current edge coordinates acquired;

S600: updating the selected area of the to-be-labeled image based on the local coordinate set acquired;

S700: judging whether an all-selected instruction is received; if yes, generating a whole coordinate set, and if not, returning to S200; and S800: acquiring category information and saving the category information and the whole coordinate set as json files; and wherein the generating the whole coordinate set comprises the following steps of:

S710: establishing a set A', adding any coordinate pointe $p_0$ in the local coordinate set to the set A', establishing other coordinate points except $p_0$ in the local coordinate set as a set $A_2$, and setting a first labeled coordinate point p as $p_0$;

S720: judging whether a number of elements in the set $A_2$ is zero; if not, executing S720a, and if yes, executing S720b;

S720a: calculating distances d between all coordinate points in the set $A_2$ and the first labeled coordinate point p', setting the first labeled coordinate point p as a coordinate point corresponding to the minimum disatnce d in the set $A_2$, adding the coordinate point corresponding to the minimum distance d in the set $A_2$ into the set A' and deleting the coordinate point from the set $A_2$, and returning to S720;

S720b: sorting the coordinate points according to an order in which the coordinate points are added to the set A';

S730: establishing the whole coordinate set, adding $p_0$ into the whole coordinate set and deleting $p_0$ from the set A', and setting a second labeled coordinate point p' as $p_0$;

S740: judging whether a number of elements in the set A' is 1; if not, executing S740a, and if yes, executing S740b;

S740a: judging whether the second labeled coordinate point p' is collinear with the two coordinate points ranked in the first two places in the set A'; if yes, executing S740a1, and if not, executing S740a2:

S740a1: deleting the coordinate point in the first place in the set A' from the set A', and returning to S740;

S740a2: setting the second labeled coordinate point p' as the coordinate point ranked in the first place in the set A', adding the coordinate point ranked in the first place in the set A' to the whole coordinate set and deleting the coordinate point from the set A', and returning to S740; and S740b: adding the coordinate points in the set A' to the whole coordinate set and outputting the whole coordinate set.

* * * * *